(12) United States Patent
Murakami et al.

(10) Patent No.: US 9,563,931 B2
(45) Date of Patent: Feb. 7, 2017

(54) CONTROL METHOD AND INFORMATION PROCESSING DEVICE

(71) Applicant: FUJITSU LIMITED, Kawasaki-shi, Kanagawa (JP)

(72) Inventors: Takeo Murakami, Kawasaki (JP); Masaaki Noro, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/638,698

(22) Filed: Mar. 4, 2015

(65) Prior Publication Data

US 2015/0301586 A1 Oct. 22, 2015

(30) Foreign Application Priority Data

Apr. 17, 2014 (JP) .................. 2014-085581

(51) Int. Cl.
  *G06F 1/32* (2006.01)
  *G06T 1/20* (2006.01)
(52) U.S. Cl.
  CPC ............... *G06T 1/20* (2013.01); *G06F 1/3243* (2013.01); *G06F 1/3237* (2013.01); *G06T 2200/28* (2013.01)

(58) Field of Classification Search
None
See application file for complete search history.

(56) References Cited

FOREIGN PATENT DOCUMENTS

| JP | 2007-41143 | 2/2007 |
| JP | 2008-271118 | 11/2008 |
| JP | 2011-60193 | 3/2011 |
| WO | 2008/126192 | 10/2008 |

*Primary Examiner* — Michelle Chin
(74) *Attorney, Agent, or Firm* — Staas & Halsey LLP

(57) ABSTRACT

A control method executed by an information processing device including a first processor and a second processor includes specifying a plurality of processes which issued orders for causing the first processor to execute a drawing process for drawing a frame, the plurality of processes being executed by the second processor, first determining whether the drawing process is completed, based on a comparison between the specified plurality of processes and specific processes, and controlling, based on a result of the first determining, a state regarding a power consumption of the first processor until the first processor starts another drawing process for drawing another frame.

15 Claims, 15 Drawing Sheets

FIG. 3

| NAME | PROCESS ID 14b |
|---|---|
| APPLICATION PROCESS | A |

FIG. 6

| S | A | A |

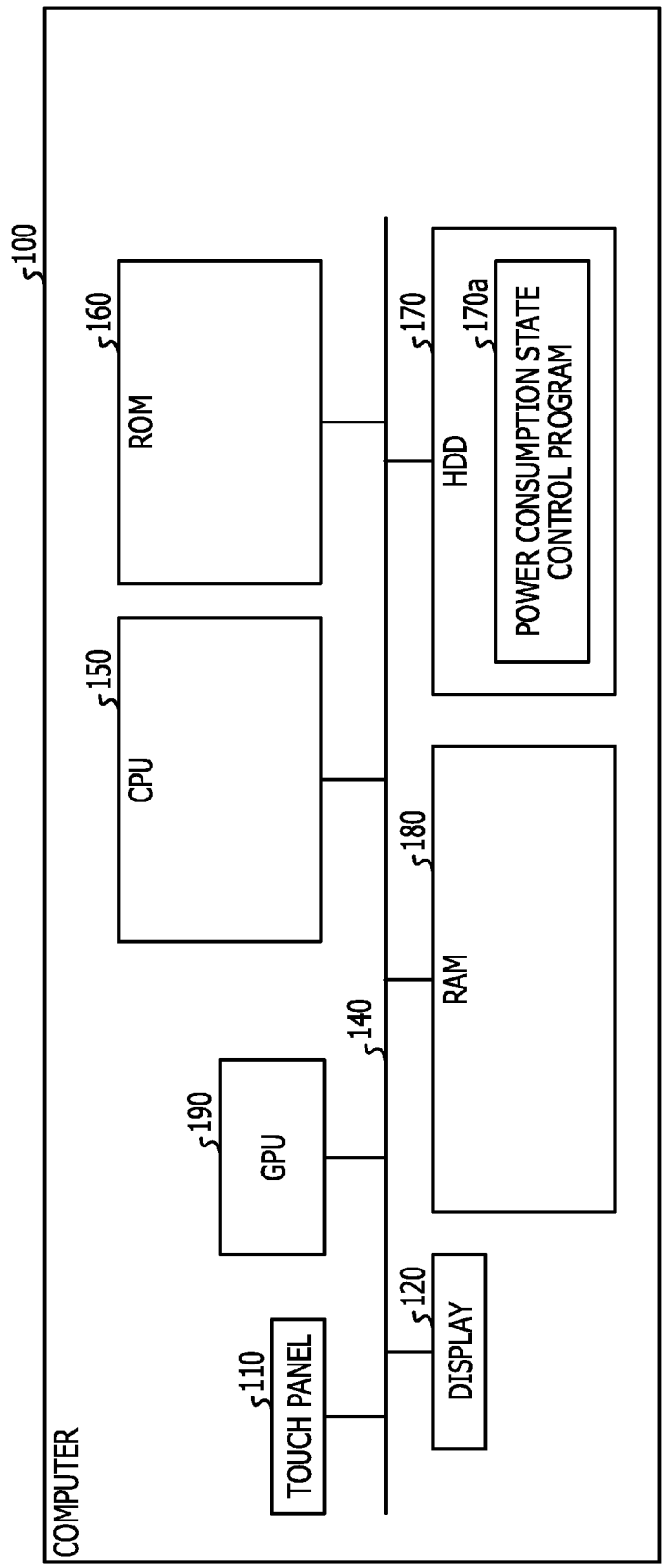

CONTROL METHOD AND INFORMATION PROCESSING DEVICE

CROSS-REFERENCE TO RELATED APPLICATION

This application is based upon and claims the benefit of priority of the prior Japanese Patent Application No. 2014-085581, filed on Apr. 17, 2014, the entire contents of which are incorporated herein by reference.

FIELD

The embodiments discussed herein are related to a technique for controlling a power consumption state of an information processing device.

BACKGROUND

There are smart devices which include a graphics processing unit (GPU) which executes drawing process and a central processing unit (CPU) that issues a drawing command to GPU. Smart devices are also referred to as smart terminals. In such a smart terminal, in order to reduce power consumption, in GPU, while drawing process is not performed, clock gating in which input of a clock signal to GPU is stopped is performed. For example, related art is disclosed in International Publication Pamphlet No. WO 2008/126192, Japanese Laid-open Patent Publication No. 2008-271118, Japanese Laid-open Patent Publication No. 2007-41143, and Japanese Laid-open Patent Publication No. 2011-60193.

SUMMARY

According to an aspect of the invention, a control method executed by an information processing device including a first processor and a second processor includes specifying a plurality of processes which issued orders for causing the first processor to execute a drawing process for drawing a frame, the plurality of processes being executed by the second processor, first determining whether the drawing process is completed, based on a comparison between the specified plurality of processes and specific processes, and controlling, based on a result of the first determining, a state regarding a power consumption of the first processor until the first processor starts another drawing process for drawing another frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a table illustrating an example of a data structure of process operation information;

FIG. 6 is a diagram illustrating an example of a pattern of a predetermined process according to the first embodiment;

FIG. 15 is a diagram illustrating an example of a computer that executes a power consumption state control program.

DESCRIPTION OF EMBODIMENTS

In the above-described conventional smart terminal, in order to further reduce power consumption, power gating, in addition to clock gating, in which power supply is stopped is possibly performed on GPU. However, when power gating, in addition to clock gating, is performed while GPU is not performing drawing process, it simply takes time for the state of the smart terminal to change from a state where power supply is stopped to an operable state. Therefore, if a time from a completion of drawing process to a start of next drawing process is short, it takes time for GPU to be in an operable state, and thus, drawing performance is degraded. Accordingly, in conventional smart terminals, a problem arises in which it is difficult to further reduce power consumption.

According to an aspect, it is an object of the technique disclosed in this embodiment to reduce power consumption in an information processing device, specifically, a smart terminal.

Each of embodiments of a smart terminal, a method for controlling a power consumption state, and a power consumption state control program according to the present disclosure will be described below in detail with reference to the accompanying drawings. Note that each embodiment is not intended to limit the disclosed technique. Each embodiment may be combined with another embodiment, as appropriate, in the range that does not contradict to processing contents.

First Embodiment
[Configuration of Smart Terminal 10]

Figure 1:
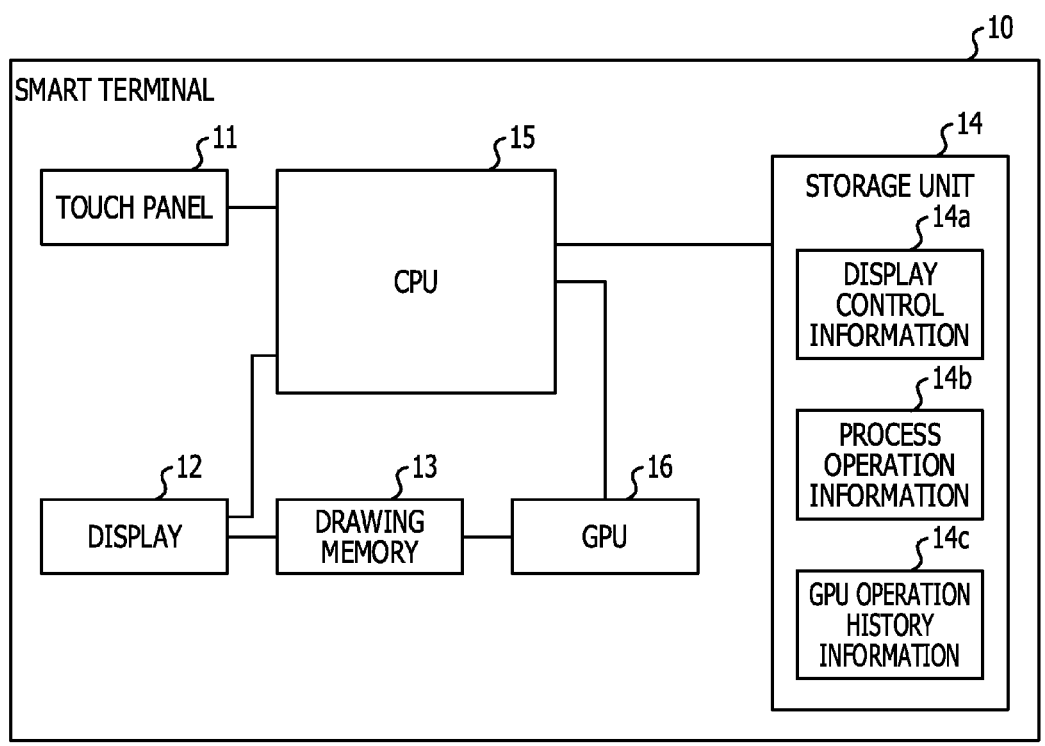
FIG. 1 is a diagram illustrating an example of a configuration of a smart terminal according to a first embodiment.

First, an example of a configuration of a smart terminal according to a first embodiment will be described. FIG. 1 is a diagram illustrating an example of a configuration of a smart terminal according to the first embodiment.

As illustrated in FIG. 1, a smart terminal 10 includes a touch panel 11, a display 12, a drawing memory 13, a storage unit 14, CPU 15, and GPU 16.

The touch panel 11 receives an operation of a user, and outputs information indicating the received operation to CPU 15.

The display 12 is controlled by a display driver 23b, which will be described later, so as to display an image indicated by image data stored in the drawing memory 13, and thereby, displays the image. Also, the display 12 is controlled by the display driver 23b, which will be described later, so as to update an image that is to be displayed at a predetermined frame rate (for example, 60 frame per second (fps)), and thereby, updates the image that is to be displayed at the predetermined frame rate. Also, the display 12 outputs a vertical synchronizing signal (VSYNC) to CPU 15 at predetermined time intervals. For example, if the predetermined frame rate is N [fps], the display 12 outputs VSYNC to CPU 15 every 1/N seconds. Note that, the intervals (1/N [seconds]) at which VSYNC is output corresponds to the length of one frame.

In the drawing memory 13, image data is stored by GPU 16.

The storage unit 14 stores various types of information. For example, the storage unit 14 stores display control information 14a, process operation information 14b, and GPU operation history information 14c.

Figure 2:
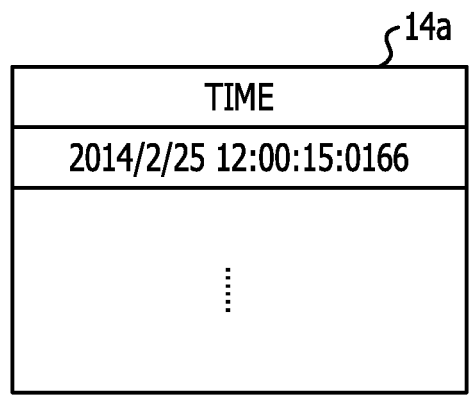
FIG. 2 is a diagram illustrating an example of a data structure of display control information.

In the display control information 14a, a time point at which VSYNC is output from the display 12 is registered by the display driver 23b, which will be described later. FIG. 2 is a diagram illustrating an example of a data structure of display control information. For example, as illustrated in FIG. 2, in the display control information 14a, the time point at which VSYNC is output from the display 12 is registered. A first record of the display control information 14a, which is illustrated in the example of FIG. 2, indicates that VSYNC was output from the display 12 at 12 o'clock 00 minutes 15.0166 seconds on Feb. 25, 2014.

Figure 3:
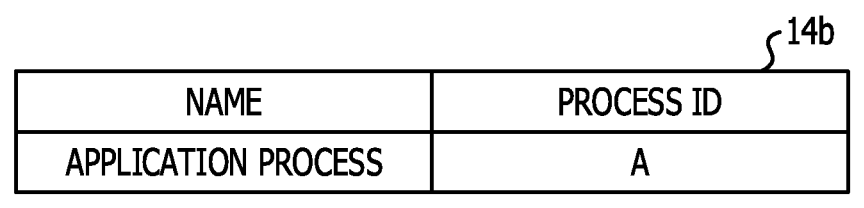

In the process operation information 14b, information regarding a process being executed by CPU 15 is registered by an operating system (OS) kernel 23, which will be described later. FIG. 3 is a table illustrating an example of a data structure of the process operation information. For example, as illustrated in FIG. 3, the process operation information 14b includes respective items of "name" and "process identification (ID)". In the item of "name", the name of a process being executed by CPU 15 is registered. In the item of "process ID", an ID (a process ID) used for identifying a process having a name registered in the item of "name" of the same record is registered. The first record of the process operation information 14b illustrated in the example of FIG. 3 indicates that CPU 15 is currently executing the process that has the name "application process" and is identified by the process ID "A".

Figure 4:
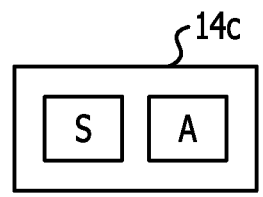
FIG. 4 is a diagram illustrating an example of a data structure of GPU operation history information.

In the GPU operation history information 14c, in the nearest one frame, a process that issued a drawing command to GPU 16 is registered in the order of issuing a drawing command by a drawing end determination unit 24, which will be described later. FIG. 4 is a diagram illustrating an example of a data structure of GPU operation history information. For example, as illustrated in the example of FIG. 4, in the GPU operation history information 14c, in the nearest one frame, a process ID "S" of a process that issued a drawing command first and a process ID "A" of a process that issued a drawing command second are registered in the nearest one frame. That is, the GPU operation history information 14c illustrated in the example of FIG. 4 indicates that, in the nearest one frame, the process that is indicated by the process ID "S" and has a name "image composing processing process" issued a drawing command first. Also, the GPU operation history information 14c illustrated in the example of FIG. 4 indicates that, in the nearest one frame, that process that is indicated by the process ID "A" and has the name "application process" issued a drawing command second. In the following description, a process having the name "image composing processing process" may be merely referred to as an "image composing processing process", and a process having the name "application process" may be merely referred to as an "application process".

Returning the description of FIG. 1, CPU 15 controls the operation of the entire smart terminal 10. GPU 16 stores image data of an image that is to be displayed on the display 12 in the drawing memory 13. GPU 16 is an example of a first processor that performs drawing process. CPU 15 is an example of a second processor that executes a process that issues an order included in drawing process on GPU 16.

Figure 5:
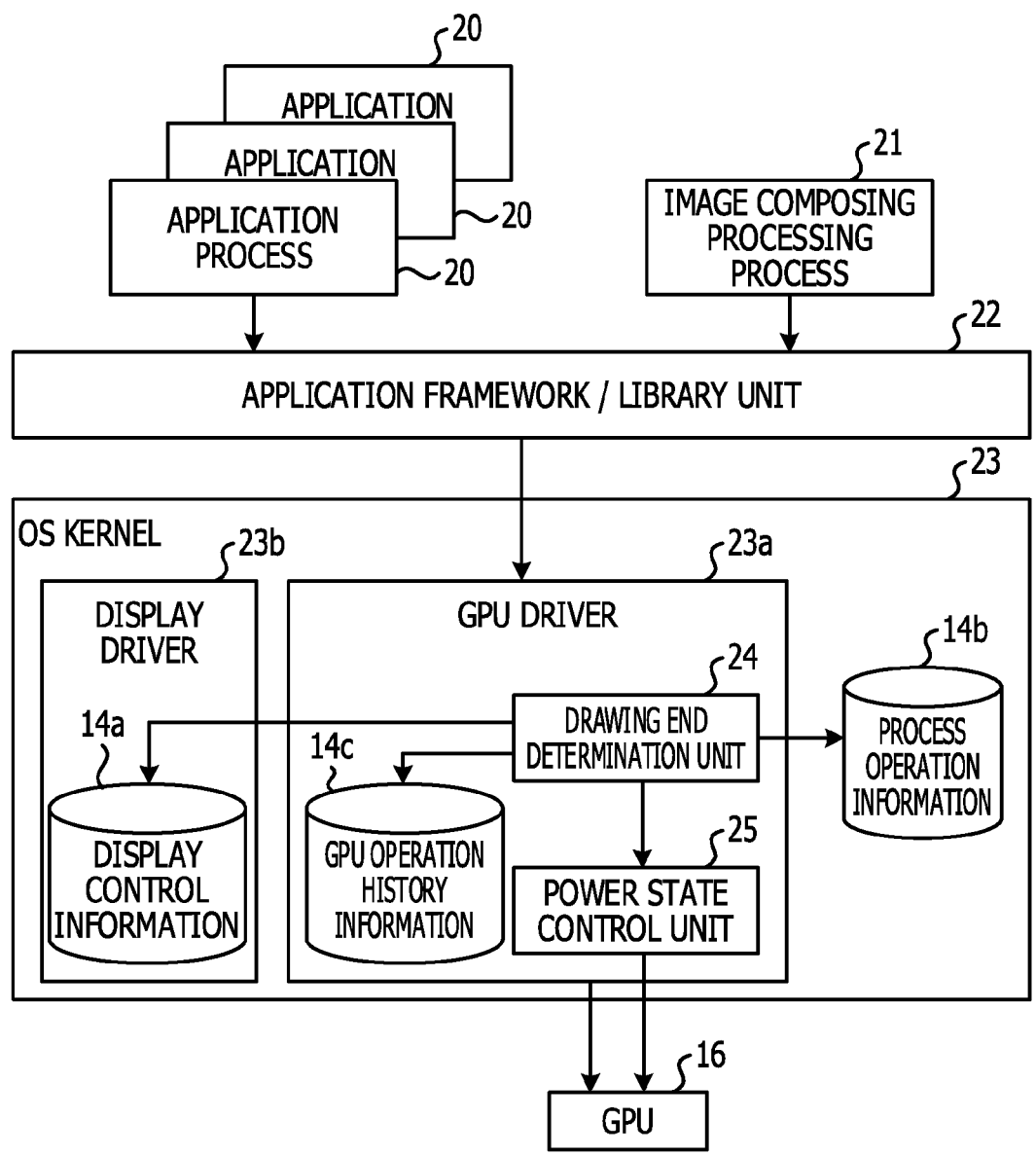
FIG. 5 is a diagram illustrating an example of processing, according to the first embodiment, up to a part of drawing process based on a drawing command is executed by GPU from an issuance of the drawing command made by a process executed by CPU.

FIG. 5 is a diagram illustrating an example of processing, according to the first embodiment, up to a part of drawing process based on a drawing command is executed by GPU from an issuance of the drawing command made by a process executed by CPU. Drawing process herein is processing including one or more drawing commands (processing including processing executed by one or more drawing commands). A drawing command is an example of an order included in drawing process.

An application process 20 and an image composing processing process 21 illustrated in the example of FIG. 5 are processes executed by CPU 15. The application process 20 is a process of an application used by a user of the smart terminal 10. Examples of the application include a browser and an e-mail. The application process 20 generates a drawing command for causing the display 12 to display a processing result. The drawing command is a command for causing GPU 16 to execute processing. That is, the application process 20 issues a drawing command to GPU 16. The application process 20 outputs the generated drawing command to an application framework/library unit 22. In the following description, the "application framework/library unit 22" will be merely referred to as a "library unit 22". Note that, in the example of FIG. 5, the number of application processes 20 is three and each of the three application processes 20 is the corresponding one of respective processes of three different applications, but the number of various processes is arbitrary.

The image composing processing process 21 generates a drawing command for composing pictures indicating processing results of a plurality of applications together and storing image data indicating a composed picture in the drawing memory 13. The drawing command is a command for causing GPU 16 to execute processing. That is, the image composing processing process 21 issues a drawing command to GPU 16. The image composing processing process 21 outputs the generated drawing command to the library unit 22.

The library unit 22 is a module that provides various functions used by an application and a service program, and is executed by CPU 15. For example, when the library unit 22 receives drawing commands output from the application process 20 and the image composing processing process 21, the library unit 22 converts the received drawing command to a drawing command corresponding to OS, and outputs the converted drawing command to the OS kernel 23. Note that OS is executed by CPU 15. Examples of OS include Android.

The OS kernel 23 is a core part of OS, and manages data exchange between a software and a hardware. For example, the OS kernel 23 registers information (for example, the name and process ID of a process) regarding process being executed by CPU 15 in the process operation information 14b. A specific example will be described. For example, when the process being executed by CPU 15 is changed to another process, the OS kernel 23 deletes information regarding the process that has been executed before the change of the process from the process operation information 14b, and registers information regarding the another process in the process operation information 14b. The OS kernel 23 includes a GPU driver 23a and the display driver 23b.

The GPU driver 23a controls GPU 16. For example, when the GPU driver 23a receives a drawing command output from the library unit 22, the GPU driver 23a converts the received drawing command to a drawing command corresponding to GPU 16, which is a hardware, and outputs converted drawing command to GPU 16.

The GPU driver 23a includes the drawing end determination unit 24 and a power state control unit 25.

The drawing end determination unit 24 specifies a process that issued a drawing command to GPU 16. The drawing end determination unit 24 is an example of a specifying unit. The drawing end determination unit 24 determines whether or not the history of the specified process corresponds to a pattern of a predetermined process that is executed by CPU 15 in one frame. If the drawing end determination unit 24 determines that the history corresponds to the pattern, the drawing end determination unit 24 determines whether or not a time from an end timing of the specified process to a start time point of a next frame is a predetermined threshold or more. If the drawing end determination unit 24 determines that the time is the predetermined threshold or more, the drawing end determination unit 24 instructs the power state control unit 25 to cause a power consumption state of GPU 16 to change to a state (a sleep state) where the power consumption is the smallest, which is one of a plurality of power consumption states of GPU 16. Herein, the plurality of power consumption states include, in addition to the above-described sleep state, an active state that is a power consumption state with which GPU 16 is operable, and an active standby state where the power consumption is greater than that in the sleep state but is smaller than that in the active state. For example, among the above-described three power consumption states, the sleep state is a state where it takes the most amount of time for the power consumption state to recover to an active state. Also, the active standby state is a state where it takes the least amount of time for the power consumption state to recover to an active state. On the other hand, if the drawing end determination unit 24 determines that the history does not correspond to the pattern, or if the drawing end determination unit 24 determines that the time is less than the predetermined threshold, the drawing end determination unit 24 performs next processing. That is, the drawing end determination unit 24 notifies the power state control unit 25 of the active standby state such that the state of GPU 16 changes to one of the plurality of consumption power consumption states other than the sleep state, that is, for example, the active standby state.

An example of the drawing end determination unit 24 will be described. For example, when the drawing end determination unit 24 is notified of a message indicating the completion of execution of processing based on a drawing command by GPU 16, the drawing end determination unit 24 specifies the process ID of a process that issued a drawing command to GPU 16. In this case, the drawing end determination unit 24 specifies a process ID registered in the process operation information 14b as the process ID of the process that issued a drawing command to GPU 16 with reference to the process operation information 14b. Then, the drawing end determination unit 24 registers the specified process ID in the GPU operation history information 14c in the order of issuing a drawing command.

The drawing end determination unit 24 compares the pattern of the process indicated by the process ID registered in the GPU operation history information 14c and the pattern of the above-described predetermined process to each other, and determines whether or not both of the patterns correspond to each other. The pattern of the predetermined process was set by a developer of the smart terminal 10 or the like in advance. For example, the pattern of the predetermined process is stored in the storage unit 14. The pattern of the predetermined process will be described below with reference to FIG. 6. FIG. 6 is a diagram illustrating an example of a pattern of a predetermined process according to the first embodiment. The pattern of the predetermined process illustrated in the example of FIG. 6 indicates that, in one frame, the image composing processing process 21 indicated by the process ID "S" issues a drawing command first. The pattern of the predetermined process illustrated in the example of FIG. 6 indicates that, in one frame, the application process 20 indicated by the process ID "A" issues a drawing command second and third. Therefore, if the pattern of the predetermined process and the pattern of the process indicated by the process ID registered in the GPU operation history information 14c correspond to each other, the execution of all processing, among processing included in drawing process, which is executed in one frame, is completed. On the other hand, if both of the patterns do not correspond to each other, in one frame, the execution of all processing, among processing included in drawing process, which is executed in one frame, is not completed (that is, in one frame, an unexecuted drawing command exists).

For example, if the drawing end determination unit 24 compares the pattern of the process indicated by the process ID registered in the GPU operation history information 14c, as illustrated in FIG. 4, and the pattern of the predetermined process, as illustrated in FIG. 6, to each other, the drawing end determination unit 24 determines that both of the patterns do not correspond to each other. That is, in this case, a third drawing command is issued by the application process 20, and therefore, the execution of all processing, among processing included in drawing process, which is executed in one frame, is not completed.

If the drawing end determination unit 24 determines that both of the patterns correspond to each other, the drawing end determination unit 24 assigns a character string "drawing of one frame is completed", which indicates that the execution of all processing, among processing included in drawing process, which is to be executed in one frame, is completed, to a variable "determination result". On the other hand, if the drawing end determination unit 24 determines that both of the patterns do not correspond to each other, a character sting "drawing of one frame is not completed", which indicates that the execution of all processing, among processing included in drawing process, which is to be executed in one frame, is not completed, to the variable "determination result".

If the drawing end determination unit 24 assigns the character string "drawing of one frame is completed" to the variable "determination result", the drawing end determination unit 24 inquires to the display driver 23*b* about a time point at which next VSYNC is output from the display 12. Then, when the drawing end determination unit 24 receives the time point at which next VSYNC is output from the display 12 from the display driver 23*b*, the drawing end determination unit 24 determines whether or not a time from the current time point to a time point at which the time point is received is a predetermined threshold or more.

In this case, if the drawing end determination unit 24 determines that the time is the predetermined threshold or more, the drawing end determination unit 24 instructs the power state control unit 25 to cause the power consumption state of GPU 16 to change to a sleep state. If the time is a long time in which the execution of all processing, among processing included in drawing process, which is to be executed in one frame, is completed and also a time from the current time point to the time point at which next VSYNC is generated is a predetermined threshold or more, even when the power consumption state is caused to change to a sleep state, drawing performance is hardly degraded. Therefore, the drawing end determination unit 24 instructs the power state control unit 25 to cause the power consumption state of GPU 16 to change to a sleep state.

On the other hand, if the drawing end determination unit 24 determines that both of the above-described patterns do not correspond to each other, and if the drawing end determination unit 24 determines that the time from the current time point and the time point at which the time is received is less than a predetermined threshold, the drawing end determination unit 24 instructs the power state control unit 25 to cause the power consumption state of GPU 16 to change to an active standby state. If the execution of all processing, among processing included in drawing process, which is to be executed in one frame, is not completed, or if the execution of the all processing is completed but there is only a short time before next drawing process is started, when the power consumption state of GPU 16 is caused to change to a sleep state, the consequence is the following. That is, it takes a certain amount of time for GPU 16 to recover to an active state. Therefore, drawing performance is degraded. Then, the drawing end determination unit 24 instructs the power state control unit 25 to cause the power consumption state of GPU 16 to change to not a sleep state but an active standby state, from which the power consumption state may recover to an active state in a shorter time than a time which it takes for the power consumption state to recover from the sleep state to an active state.

When the power state control unit 25 receives an instruction of causing the power consumption state of GPU 16 to change to a sleep state from the drawing end determination unit 24, the power state control unit 25 performs clock gating and power gating on GPU 16 to cause the power consumption state of GPU 16 to change to a sleep state. When the power state control unit 25 receives an instruction of causing the power consumption state of GPU 16 to change to an active standby state from the drawing end determination unit 24, the power state control unit 25 performs clock gating on GPU 16 to cause the power consumption state of GPU 16 to change to an active standby state. Note that, when the power state control unit 25 receives a drawing command output from the library unit 22, the power state control unit 25 restarts input of a clock signal and power supply to GPU 16 to cause the power consumption state of GPU 16 to change to an active state.

Figure 7:
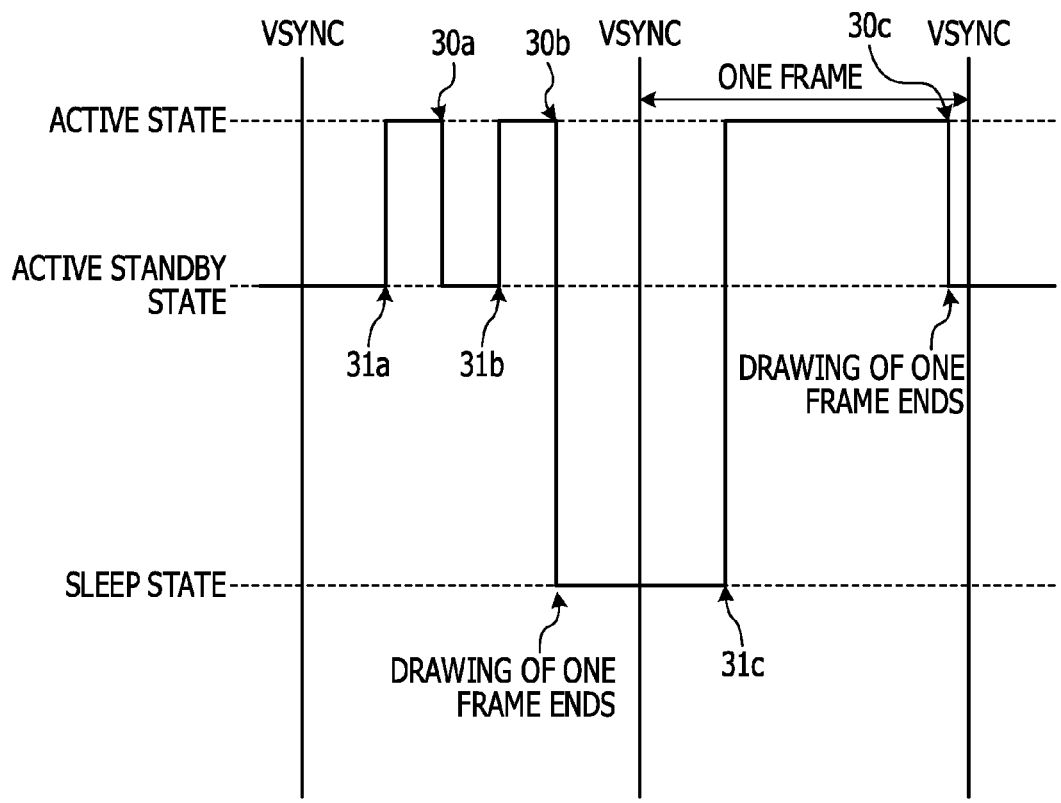
FIG. 7 is a diagram illustrating an example of state change of power of GPU.

FIG. 7 is a diagram illustrating an example of state change of power of GPU. As illustrated in the example of FIG. 7, in one frame between two VSYNCs, when the power state control unit 25 receives a drawing command output from the library unit 22 with a timing indicated by the reference character 31*a*, the power state control unit 25 causes the power consumption state of GPU 16 to change to an active state.

When the drawing end determination unit 24 is notified of a message indicating the completion of execution of processing with the timing indicated by a reference character 30*a*, the drawing end determination unit 24 performs next processing because the execution of all processing, among processing included in drawing process, which is to be executed in one frame, is not completed. That is, the drawing end determination unit 24 instructs the power state control unit 25 to cause the power consumption state of GPU 16 to change to an active standby state. Thus, the power consumption state of GPU 16 changes to an active standby state.

When the power state control unit 25 receives a drawing command output from the library unit 22 with the timing indicated by the reference character 31*b*, the power state control unit 25 causes the power consumption state of GPU 16 to change to an active state.

When the drawing end determination unit 24 is notified of a message indicating the completion of execution of processing based on the drawing command by GPU 16 with the timing indicated by a reference character 30*b*, the drawing end determination unit 24 instructs the power state control unit 25 to cause the power consumption state of GPU 16 to change to a sleep state. Thus, the power consumption state of GPU 16 is caused to change to a sleep state. As described above, the reason why the power consumption state is caused to change to a sleep state is that the execution of all processing, among processing included in drawing process, which is to be executed in one frame, is completed, and also a time from the timing 30*b* to the time point at which next VSYNC is generated is long, that is, a predetermined threshold or more.

In the next one frame, when the power state control unit 25 receives a drawing command output from the library unit 22 with a timing indicated by the reference character 31*c*, the power state control unit 25 causes the power consumption state of GPU 16 to change to an active state.

When the drawing end determination unit 24 is notified of a message indicating the completion of execution of processing based on the drawing command by GPU 16 with the timing indicated by the reference character 30*c*, the drawing end determination unit 24 instructs the power state control unit 25 to cause the power consumption state of GPU 16 to change to an active standby state. Thus, the power consumption state of GPU 16 is caused to change to an active standby state. As described above, the reason why the power consumption state of GPU 16 is caused to change to an active standby state is that the execution of all processing, among processing included in drawing process, which is to be executed in one frame, is completed, but a time from the timing 30*c* to the time point at which next VSYNC is generated is shot, that is, less than a predetermined threshold.

Returning to the description of FIG. 5, each time the display driver 23*b* receives VSYNC output from the display 12, the display driver 23*b* controls the display 12 such that the display 12 displays an image indicated by image data stored in the drawing memory 13. Thus, the display 12 updates the image that is displayed at a predetermined frame rate.

Also, the display driver 23b registers a time point at which the display driver 23b received VSYNC as the time point at which VSYNC was output from the display 12 in the display control information 14a.

When the display driver 23b receives, from the drawing end determination unit 24, an inquiry about the time point at which next VSYNC is output from the display 12, the display driver 23b performs next processing. That is, the display driver 23b calculates a time point obtained by adding a time corresponding to one frame to a time point when nearest VSYNC registered in the display control information 14a was output from the display 12 as the time point at which next VSYNC is output from the display 12. Then, the display driver 23b outputs the calculated time point to the drawing end determination unit 24.

When GPU 16 receives a drawing command, GPU 16 executes processing based on the received drawing command. Also, when the execution of processing based on the drawing command is completed, GPU 16 notifies the GPU driver 23a of a message indicating the completion of execution of processing.

Figure 8:
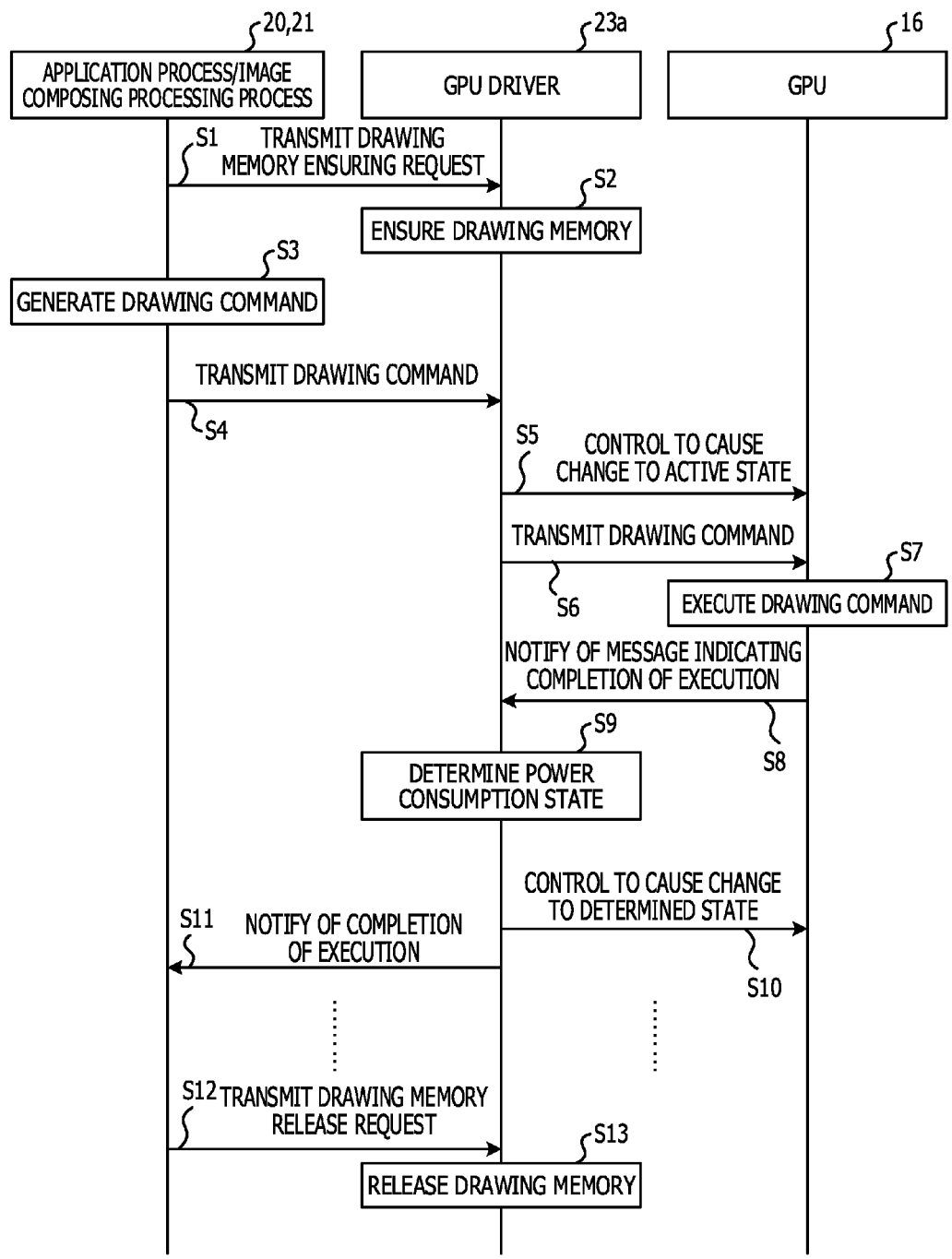
FIG. 8 is a diagram illustrating an example of application process and image composing processing process, and data exchange between a GPU driver and GPU.

Next, with reference to FIG. 8, the application process 20 and the image composing processing process 21, and data exchange between the GPU driver 23a and GPU 16 will be described. FIG. 8 is a diagram illustrating an example of application process and image composing processing process, and data exchange between a GPU driver and GPU. FIG. 8 illustrates an example where drawing process is executed.

As illustrated in FIG. 8, first, the application process 20 transmits a drawing memory allocation request, which is a request for allocatiing a drawing memory, to the GPU driver 23a (Step S1). When the GPU driver 23a receives the drawing memory allocation request, the GPU driver 23a allocates a drawing process storage area from the storage area of the storage unit 14 to thereby allocate the drawing memory 13 (Step S2).

Then, the application process 20 or the image composing processing process 21 generates a drawing command (Step S3). Then, the application process 20 or the image composing processing process 21 that generated a drawing command transmits the generated drawing command to the GPU driver 23a (Step S4).

When the power state control unit 25 of the GPU driver 23a receives the drawing command, the power state control unit 25 restarts input of a clock signal and power supply to GPU 16 to cause the power consumption state of GPU 16 to change to an active state (Step S5).

When the GPU driver 23a receives the drawing command, the GPU driver 23a converts the received drawing command to a drawing command corresponding to GPU 16, which is a hardware, and transmits the converted drawing command to GPU 16 (Step S6). Then, GPU 16 executes processing based on the drawing command (Step S7). Then, when the execution of processing based on the drawing command is completed, GPU 16 notifies the GPU driver 23a of a message indicating the completion of execution of processing (Step S8).

When the drawing end determination unit 24 of the GPU driver 23a receives a message indicating the completion of execution of processing, the drawing end determination unit 24 determines the power consumption state of GPU 16 (Step S9). Then, the power state control unit 25 of the GPU driver 23a controls GPU 16 such that the power consumption state of GPU 16 changes to the determined power consumption state (Step S10). Then, the GPU driver 23a notifies the application process 20 or the image composing processing process 21, which issued the drawing command, of the completion of execution of processing (Step S11).

In accordance with the number of processing included in drawing process, the above-described processing of Step S3 to Step S11 is repeated, and then, the application process 20 transmits a drawing memory release request, which is a request for releasing a drawing memory, to the GPU driver 23a (Step S12). When the GPU driver 23a receives a drawing memory release request, the GPU driver 23a releases the drawing process storage area to thereby release the drawing memory 13 (Step S13).

[Flow of Processing]

Figure 9:
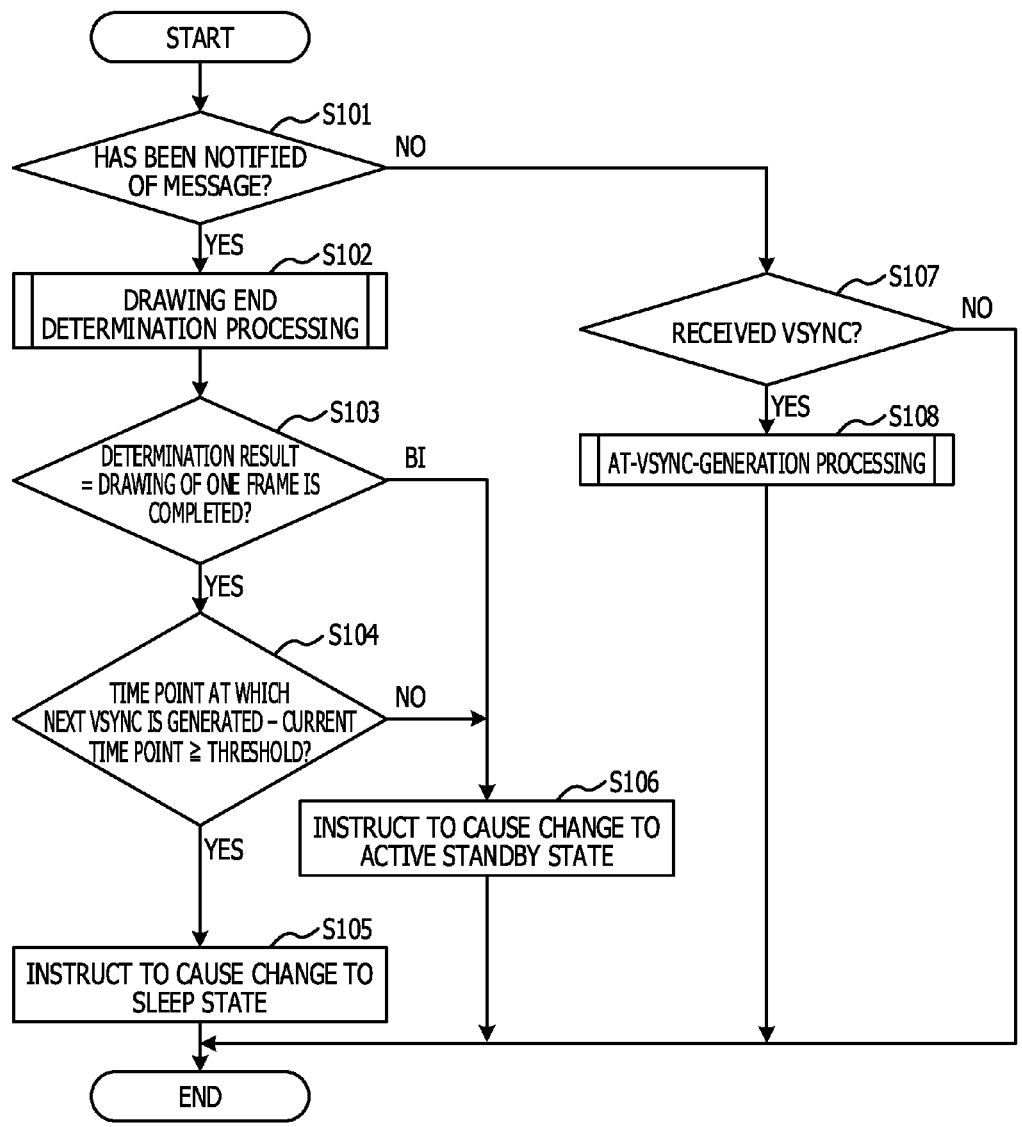
FIG. 9 is a flow chart illustrating steps of processing executed by a GPU driver according to the first embodiment.

Next, a flow of processing executed by the GPU driver 23a of the smart terminal 10 according to this embodiment will be described. FIG. 9 is a flow chart illustrating steps of processing executed by a GPU driver according to the first embodiment. Note that the processing is executed at predetermined time intervals. For example, if the frame rate is 60 fps, the processing is executed every 1/120 seconds.

As illustrated in FIG. 9, the drawing end determination unit 24 determines whether or not the drawing end determination unit 24 is notified of a message indicating the completion of execution of processing based on the drawing command by GPU 16 (Step S101). If the drawing end determination unit 24 determines that the drawing end determination unit 24 is notified of the message (YES in Step S101), the drawing end determination unit 24 executes drawing end determination processing (Step S102).

Figure 10:
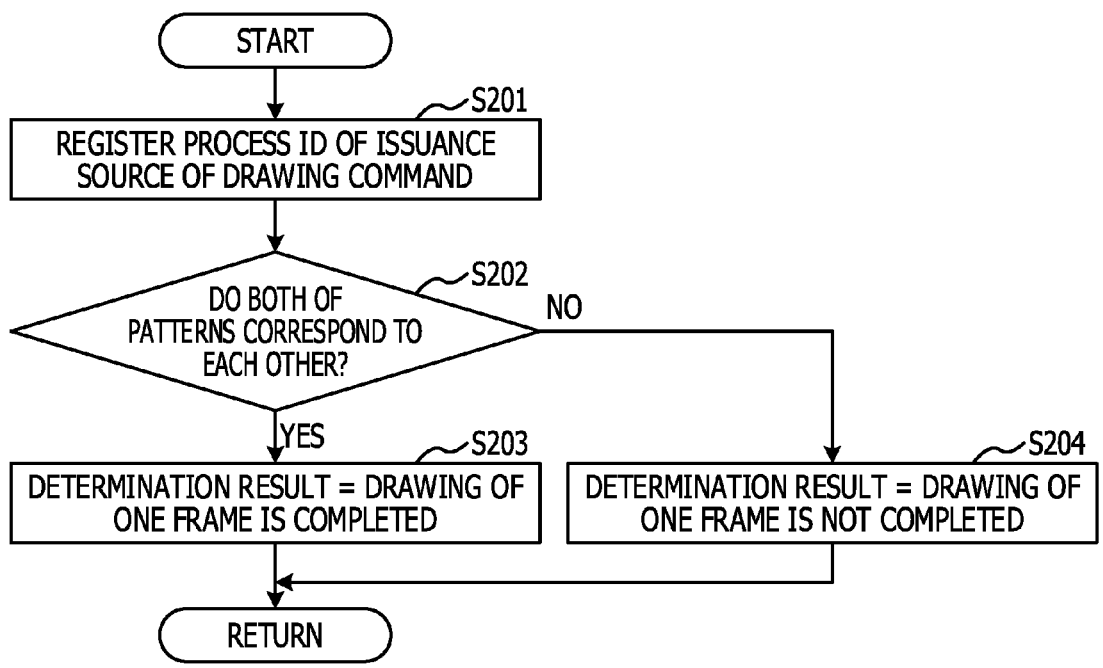
FIG. 10 is a flow chart illustrating steps of drawing end determination processing.

FIG. 10 is a flow chart illustrating steps of drawing end determination processing. As illustrated in FIG. 10, the drawing end determination unit 24 specifies the process ID of a process that issued a drawing command to GPU 16, and registers the specified process ID in the GPU operation history information 14c in the order of issuing a drawing command (Step S201).

Then, the drawing end determination unit 24 compares the pattern of the process indicated by the process ID registered in the GPU operation history information 14c and the pattern of the above-described predetermined process to each other, and determines whether or not both of the patterns correspond to each other (Step S202).

If the drawing end determination unit 24 determines that both of the patterns correspond to each other (YES in Step S202), the drawing end determination unit 24 assigns a character string "drawing of one frame is completed" to a variable "determination result" (Step S203). Then, the drawing end determination unit 24 stores the processing result in an internal memory, and returns. On the other hand, if the drawing end determination unit 24 determines that both of the patterns do not correspond to each other (NO in Step S202), a character sting "drawing of one frame is not completed", which indicates that the execution of all processing, among processing included in drawing process, which is to be executed in one frame, is not completed, to the variable "determination result" (Step S204). Then, the drawing end determination unit 24 stores the processing result in the internal memory, and returns.

Returning to the description of FIG. 9, the drawing end determination unit 24 determines whether or not the character string "drawing of one frame is completed" is assigned to the variable "determination result" (Step S103). If the drawing end determination unit 24 determines that the character string "drawing of one frame is completed" is assigned to the variable "determination result" (YES in Step S103), the drawing end determination unit 24 inquires to the display driver 23b about a time point at which next VSYNC is output from the display 12. Then, when the drawing end determination unit 24 receives the time point at which next VSYNC is output from the display 12 from the display driver 23b, the drawing end determination unit 24 determines whether or not a time from the current time point to a time point at which the time is received is a predetermined threshold or more (Step S104).

If the drawing end determination unit 24 determines that the time is the predetermined threshold or more (YES in Step S104), the drawing end determination unit 24 instructs the power state control unit 25 to cause the power consumption state of GPU 16 to change to a sleep state (Step S105), and ends the processing.

On the other hand, if the drawing end determination unit 24 determines that both of the above-described patterns do not correspond to each other (NO in Step S104), and if the drawing end determination unit 24 determines that the time is less than the predetermined threshold (NO in Step S103), the drawing end determination unit 24 performs next processing. That is, the drawing end determination unit 24 instructs the power state control unit 25 to cause the power consumption state of GPU 16 to change to an active standby state (Step S106), and ends the processing.

Also, if the drawing end determination unit 24 determines that the drawing end determination unit 24 is not notified of the message (NO in Step S101), the drawing end determination unit 24 determines whether or not the drawing end determination unit 24 received VSYNC output from the display 12 (Step S107). If the drawing end determination unit 24 determines that the drawing end determination unit 24 received VSYNC (YES in Step S107), the drawing end determination unit 24 executes at-VSYNC-generation processing (Step S108), and ends the processing. For example, the drawing end determination unit 24 deletes the process ID registered in the GPU operation history information 14c in the at-VSYNC-generation processing. If the drawing end determination unit 24 determines that the drawing end determination unit 24 has not received VSYNC (NO in Step S107), the drawing end determination unit 24 ends the processing.

As described above, the smart terminal 10 according to this embodiment includes GPU 16 that executes drawing process, and CPU 15 that executes a process that issues a drawing command, included in drawing process on GPU 16. The smart terminal 10 specifies a process that issued a drawing command. Then, the smart terminal 10 controls the power consumption state of GPU 16 until next drawing process starts, based on the history of the specified process and the end timing of the process. Thus, using the smart terminal 10, the state of GPU 16 may be caused to change to a sleep state in which the power consumption is the smallest, for example, when there is a long time before next drawing process starts. Therefore, using the smart terminal 10 according to this embodiment, the power consumption may be reduced.

Note that, in the first embodiment, a case where the power consumption states are three states, that is, an active state, an active standby state, and a sleep state, has been described, but the power consumption states are not limited thereto but may be four or more.

Also, in the first embodiment, a case where the pattern of the process indicated by the process ID registered in the GPU operation history information 14c and the pattern of a single predetermined process are compared to each other has been described. However, the pattern of the process indicated by the process ID registered in the GPU operation history information 14c and each of patterns of a plurality of predetermined processes may be compared to each other.

Also, the pattern of a predetermined process may include information indicating the type of a drawing command, the information indicating the type of the drawing command may be further registered in the GPU operation history information 14c, and then, whether or not both of the patterns correspond to each other may be determined with respect to the type of the drawing command.

Also, there are cases where, after it is determined that the pattern of the process indicated by the process ID registered in the GPU operation history information 14c and the pattern of a single predetermined process correspond to each other, in the same frame, the process ID is further registered in the GPU operation history information 14c. In such a case, it is mistakenly determined that the execution of all processing, among processing included in drawing process, which is to be executed in one frame, is completed, and therefore, the drawing end determination unit 24 may instruct the power state control unit 25 to cause the power consumption state of GPU 16 to change to an active standby state.

Second Embodiment

Figure 11:
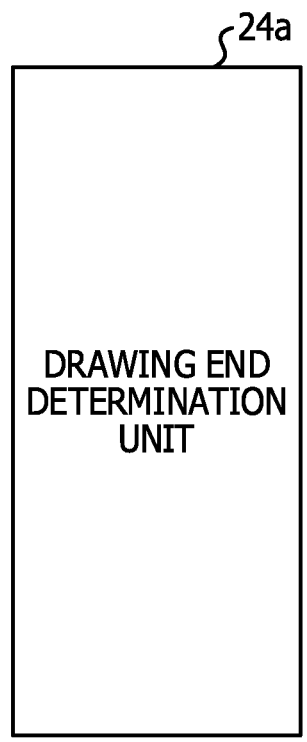
FIG. 11 is a diagram illustrating a drawing end determination unit according to a second embodiment.

Next, a smart terminal according to a second embodiment will be described. A smart terminal according to the second embodiment is configured such that the pattern of the above-described predetermined process is automatically set. Note that a similar configuration to that in the first embodiment is denoted by the same reference character as that used in the first embodiment and the description thereof may be omitted. FIG. 11 is a diagram illustrating a drawing end determination unit according to the second embodiment. A smart terminal according to the second embodiment includes, instead of the drawing end determination unit 24 according to the first embodiment, a drawing end determination unit 24a illustrated in FIG. 11. The drawing end determination unit 24a has, in addition to a similar function to the function of the drawing end determination unit 24 according to the first embodiment, a function of automatically setting the pattern of the above-described predetermined process.

Figure 12:
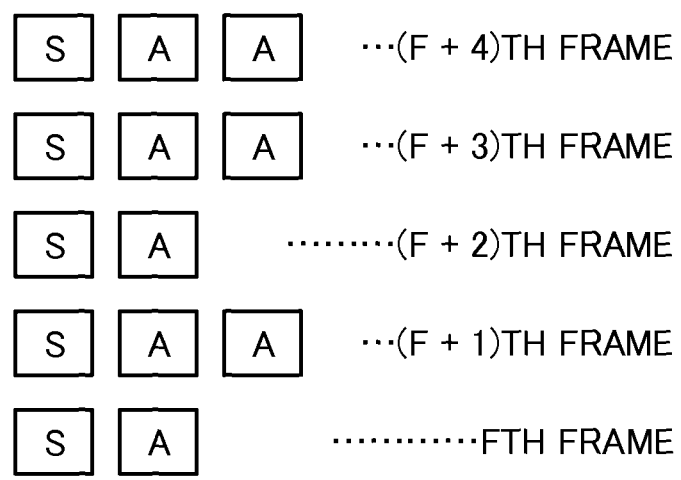
FIG. 12 is a diagram illustrating an example of processing executed by a drawing end determination unit according to the second embodiment.

An example of the drawing end determination unit 24a will be described. For example, the drawing end determination unit 24a records the history of a specified process in a history list stored in the storage unit 14 for each frame. FIG. 12 is a diagram illustrating an example of processing executed by a drawing end determination unit according to the second embodiment. The example of FIG. 12 illustrates an example of the history of a process recorded by the drawing end determination unit 24a in the history list for each of frames from an Fth frame to an (F+4)th frame. In the example of FIG. 12, the Fth frame and the (F+2)th frame have the same pattern for the history of the process, and the (F+1)th frame, the (F+3)th frame, and the (F+4)th frame have the same pattern for the history of the process.

Then, the drawing end determination unit 24a determines whether or not the patterns of the history of the process correspond to one another for all consecutive frames, that is, past N frames from the nearest frame with reference to the history list.

If the drawing end determination unit 24a determines that the patterns correspond to one another, the drawing end determination unit 24a sets the patterns of the history of the process, which were determined to correspond to one another, as the pattern of the above-described predetermined process. For example, the drawing end determination unit 24a stores the patterns of the history of the process, which were determined to correspond to one another, as the pattern of the above-described predetermined process in the storage unit 14. Thus, in the second embodiment, the pattern of a process executed by CPU 15 in one frame is set as the pattern of a predetermined process. Therefore, in the second embodiment, it may be determined with high accuracy whether or not the execution of all processing, among processing included in drawing process, which is to be executed in one frame, may be completed.

Figure 13:
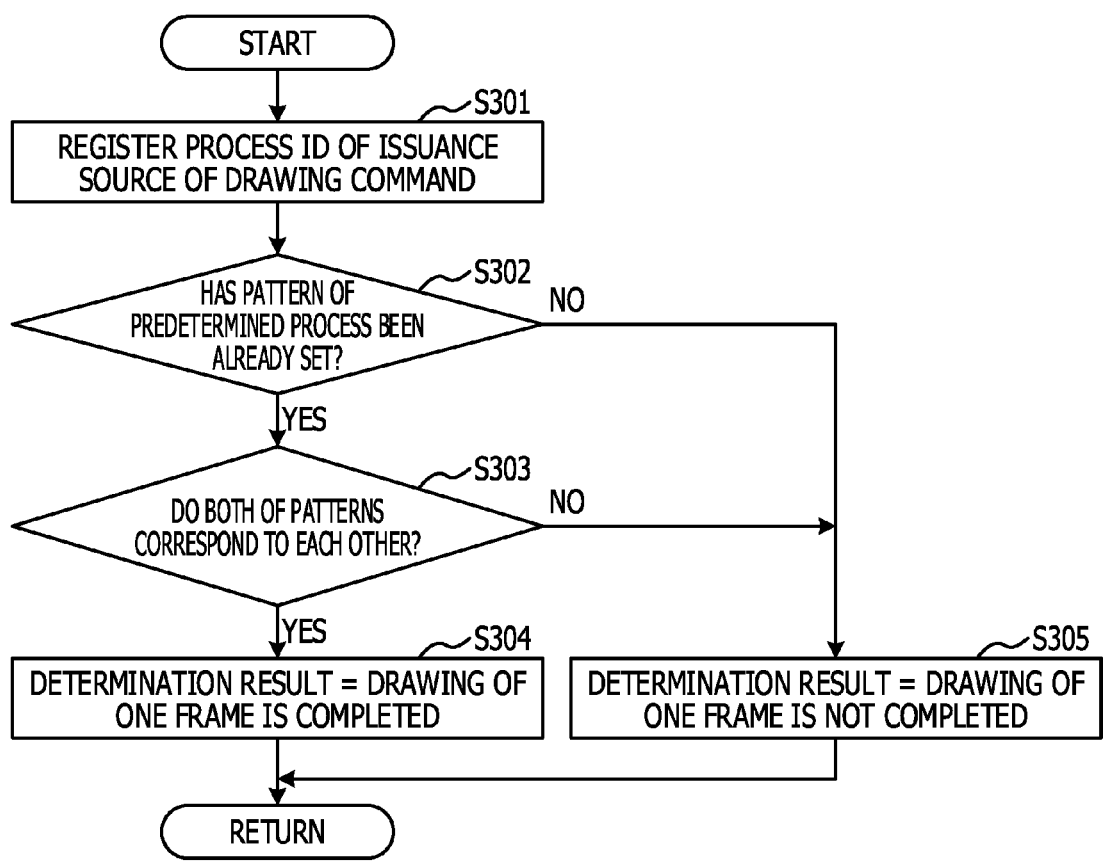
FIG. 13 is a flow chart illustrating steps of drawing end determination processing according to the second embodiment.

Next, in the second embodiment, drawing end determination processing executed in Step S102 will be described. FIG. 13 is a flow chart illustrating steps of drawing end determination processing according to the second embodiment. As illustrated in FIG. 13, the drawing end determination unit 24*a* specifies the process ID of a process that issued a drawing command to GPU 16, and registers the specified process ID to the GPU operation history information 14*c* in the order of issuing a drawing command (Step S301).

Then, the drawing end determination unit 24*a* determines whether or not the pattern of the predetermined process has been already set (Step S302). If the drawing end determination unit 24*a* determines that the pattern of the predetermined process has been already set (YES in Step S302), the drawing end determination unit 24*a* performs next processing. That is, the drawing end determination unit 24*a* compares the pattern of the process indicated by the process ID registered in the GPU operation history information 14*c* and the pattern of the above-described predetermined process, which has been already set, to each other, and determines whether or not both of the patterns correspond to each other (Step S303).

If the drawing end determination unit 24*a* determines that both of the patterns correspond to each other (YES in Step S303), the drawing end determination unit 24*a* assigns a character string "drawing of one frame is completed" to a variable "determination result" (Step S304). Then, the drawing end determination unit 24*a* stores a processing result in an internal memory, and returns. If the drawing end determination unit 24*a* determines that the pattern of the predetermined process has not been already set (NO in Step S302), and if the drawing end determination unit 24*a* determines that both of the patterns do not correspond to each other (NO in Step S303), the drawing end determination unit assigns a character sting "drawing of one frame is not completed" to the variable "determination result" (Step S305). Then, the drawing end determination unit 24*a* stores the processing result in the internal memory, and returns.

Figure 14:
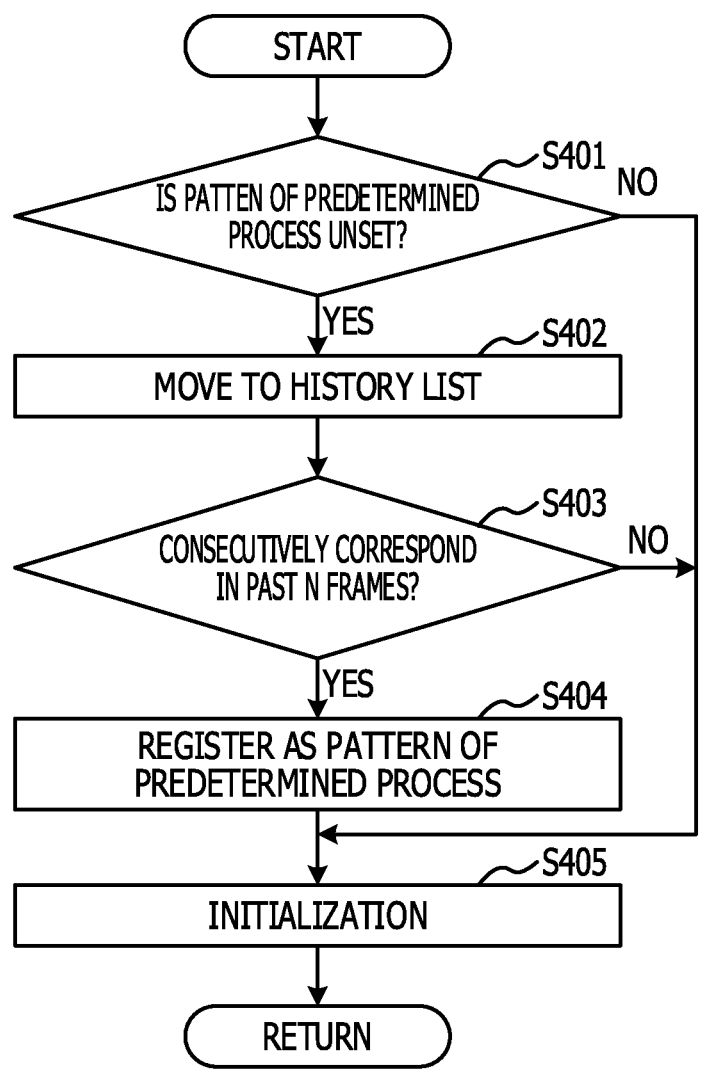
FIG. 14 is a flow chart illustrating steps of at-VSYNC-generation processing according to the second embodiment.

Next, in the second embodiment, at-VSYNC-generation processing executed in Step S108 will be described. FIG. 14 is a flow chart illustrating steps of at-VSYNC-generation processing according to the second embodiment. As illustrated in FIG. 14, the drawing end determination unit 24*a* determines whether or not the pattern of the above-described predetermined process is unset (Step S401). If the drawing end determination unit 24*a* determines that the pattern of the above-described predetermined process has been set (NO in Step S401), the drawing end determination unit 24*a* causes the process to proceed to Step S405, which will be described. On the other hand, if the drawing end determination unit 24*a* determines that the pattern of the above-described predetermined process is unset (YES in Step S401), the drawing end determination unit 24*a* causes the pattern of the process indicated by the process ID in the nearest one frame registered in the GPU operation history information 14*c* to move to the history list (Step S402).

Then, the drawing end determination unit 24*a* determines whether or not the patterns of the history of the process correspond to one another for all consecutive frames, that is, past N frames from the nearest frame with reference to the history list (Step S403). If the drawing end determination unit 24*a* determines that that the patterns do not correspond to one another (NO in Step S403), the drawing end determination unit 24*a* causes the process to proceed to Step S405, which will be described later. On the other hand, if the drawing end determination unit 24*a* determines that the patterns correspond to one another (YES in Step 403), the drawing end determination unit 24*a* sets the patterns of the history of the process, which were determined to correspond to one another, as the pattern of the above-described predetermined process (Step S404).

Then, the drawing end determination unit 24*a* deletes the process ID registered in the GPU operation history information 14*c*, initializes register contents of the GPU operation history information 14*c* (Step S405), stores the processing result in the internal memory, and returns.

As described above, a smart terminal according to the second embodiment sets the pattern of a process actually executed by the CPU 15 in one frame as the pattern of a predetermined process. Therefore, using the smart terminal according to the second embodiment, it may be determined with high accuracy whether or not the execution of all processing, among processing included in drawing process, which is to be executed in one frame, is completed.

Embodiments regarding a disclosed unit have been described above, but the present disclosure may be implemented in various other embodiments than the above-described embodiments.

For example, all or a part of each processing described in the above-described embodiments, which have been described to be automatically performed, may be manually performed. Also, all or a part of each processing described in the above-described embodiments, which have been described to be manually performed, may be automatically performed using a known method.

Also, processing performed in each step of each processing described in the above-described embodiments may be arbitrarily divided into groups or may be put together in accordance with various loads, use conditions, and the like. Also, each step may be omitted.

Also, the order of processing performed in each step of each processing described in the above-described embodiments may be changed in accordance with various loads, use conditions, and the like.

Moreover, each component element of each unit illustrated in the drawings is based on a function concept, and may not be configured physically as illustrated in the drawings. That is, specific embodiments of disintegration and integration of each unit are not limited to those illustrated in the drawings, and all or some of the units may be disintegrated/integrated functionally or physically in an arbitrary unit in accordance with various loads, use conditions, and the like.

[Power Consumption State Control Program]

Various types of processing described in each embodiment may be realized by causing a computer, such as a personal computer, a work station, and the like, to execute a program prepared in advance. Then, in the following embodiment, an example computer that executes a power consumption state control program which has a similar function to that described in each of the above-described embodiments will be described with reference to FIG. 15.

FIG. 15 is a diagram illustrating an example of a computer that executes a power consumption state control program. As illustrated in FIG. 15, a computer 100 includes a touch panel 110 and a display 120. Furthermore, the computer 100 includes CPU 150, ROM 160, HDD 170, RAM 180, and GPU 190. The touch panel 110, the display 120, CPU 150, ROM 160, HDD 170, RAM 180, and GPU 190 are coupled with one another via a bus 140.

As illustrated in FIG. 15, in HDD 170, a power consumption state control program 170a that has a similar function to that of the above-described GPU driver 23a is stored in advance.

Then, CPU 150 reads out the power consumption state control program 170a from HDD 17 and loads the power consumption state control program 170a into RAM 180. Thus, the power consumption state control program 170a functions as a power consumption state control process. The power consumption state control process loads various types of data read out from HDD 170 into an area of RAM 180, which is allocated to the power consumption state control process itself, and executes various types of processing based on the various types of loaded data.

Note that there may be cases where the power consumption state control program 170a is not initially stored in HDD 170 or ROM 160. For example, each program is stored in a "portable physical medium", such as a flexible disk, that is, so-called FD, CD-ROM, a DVD disk, a magneto optical disk, an IC card, and the like, which is inserted to the computer 100. Then, the computer 100 may obtain each program from the portable physical medium to execute the program. Also, each program may be stored in another computer, a server apparatus, or the like, coupled to the computer 100 via a public line, the Internet, LAN, WAN, or the like, and the computer 100 may obtain each program from the another computer, the server apparatus, or the like, to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by an information processing device including a first processor configured to execute a drawing process and a second processor configured to control the first processor, the control method comprising:
   specifying, by the second processor, a plurality of processes executed by the second processor for issuing a plurality of commands to cause the first processor to execute the drawing process;
   determining whether a pattern including a plurality of identifiers respectively identifying one of the plurality of processes and indicating an execution order of the plurality of processes corresponds to a predetermined pattern; and
   determining whether a period from an end timing of the plurality of processes to a restart timing of the plurality of processes is equal to or more than a threshold, when it is determined that the pattern corresponds to the predetermined pattern;
   changing a power consumption state of the first processor to a sleep state, when it is determined that the period is equal to or more than the threshold; and
   maintaining the power consumption state, when it is determined that the period is not equal to or more than the threshold.

2. The control method according to claim 1, wherein the determining includes:
   determining that the drawing process is completed when it is determined that the pattern corresponds to the predetermined pattern, and
   determining that the drawing process is not completed when it is determined that the pattern does not correspond to the predetermined pattern.

3. The control method according to claim 2, wherein the sleep state is a state where the power consumption is the smallest when the drawing process is completed.

4. The control method according to claim 2, wherein
   the changing includes changing the power consumption state from an active state with which the first processor is operable to the sleep state, when it is determined that the drawing process is completed and when the period is equal to or more than the threshold, and
   the maintaining includes changing the power consumption state from the active state to an active standby state where the power consumption is greater than a power consumption in the sleep state but is smaller than a power consumption in the active state, when it is determined that the drawing process is completed and when the period is not equal to or more than the threshold.

5. The control method according to claim 4, wherein the control method comprising
   changing the power consumption state from the active state to the active standby state, when it is determined that the drawing process is not completed.

6. The control method according to claim 4,
   wherein a time to recover from the active standby state to the active state is shorter than a time to recover from the sleep state to the active state.

7. The control method according to claim 1, further comprising
   wherein the specifying includes specifying the plurality of processes by referring to operation history information in which the plurality of processes being stored in an order of issuing the plurality of processes.

8. The control method according to claim 1,
   wherein the plurality of commands include a drawing command for displaying a processing result of an application used by a user of the information processing device and an image composing command for composing a plurality of pictures indicating processing results of a plurality of applications together and storing image data indicating a composed picture generated by the composing in a memory.

9. The control method according to claim 8, further comprising
   determining, by the second processor, whether a message indicating a completion of execution of processing based on the drawing command is received from the first processor, and
   wherein the specifying includes specifying the plurality of processes when it is determined that the message is received from the first processor.

10. An information processing device comprising:
    a first processor configured to execute a drawing process; and
    a second processor configured to control the first processor,
    wherein the second processor is configured to:

specify a plurality of processes executed by the second processor for issuing a plurality of commands to cause the first processor to execute the drawing process, determine whether a pattern including a plurality of identifiers respectively identifying one of the plurality of processes and indicating an execution order of the plurality of processes corresponds to a predetermined pattern, determine whether a period from an end timing of the plurality of processes to a restart timing of the plurality of processes is equal to or more than a threshold, when it is determined that the pattern corresponds to the predetermined pattern, change a power consumption state of the first processor to a sleep state, when it is determined that the period is equal to or more than the threshold; and maintain the power consumption state, when it is determined that the period is not equal to or more than the threshold.

11. The information processing device according to claim 10, wherein the second processor it is configured to:

determine that the drawing process is completed when it is determined that the pattern corresponds to the predetermined pattern, and determine that the drawing process is not completed when it is determined that the pattern does not correspond to the predetermined pattern.

12. The information processing device according to claim 11, wherein the sleep state is a state where the power consumption is the smallest when the drawing process is completed.

13. A non-transitory computer-readable storage medium storing a program that causes an information processing device to execute a process, the information processing device including a first processor configured to execute a drawing process and a second processor configured to control the first processor, the process comprising:

specifying, by the second processor, a plurality of processes executed by the second processor for issuing a plurality of commands to cause the first processor to execute the drawing process;

determining whether a pattern including a plurality of identifiers respectively identifying one of the plurality of processes and indicating an execution order of the plurality of processes corresponds to a predetermined pattern; and determining whether a period from an end timing of the plurality of processes to a restart timing of the plurality of processes is equal to or more than a threshold, when it is determined that the pattern corresponds to the predetermined pattern;

changing a power consumption state of the first processor to a sleep state, when it is determined that the period is equal to or more than the threshold; and maintaining the power consumption state, when it is determined that the period is not equal to or more than the threshold.

14. The non-transitory computer-readable storage medium according to claim 13, wherein the process further comprising:

determining that the drawing process is completed when it is determined that the pattern corresponds to the predetermined pattern, and determining that the drawing process is not completed when it is determined that the pattern does not correspond to the predetermined pattern.

15. The non-transitory computer-readable storage medium according to claim 14, wherein the sleep state is a state where the power consumption is the smallest when the drawing process is completed.

* * * * *